(12) United States Patent
Jeitner

(10) Patent No.: US 8,681,014 B2
(45) Date of Patent: Mar. 25, 2014

(54) INDICATOR DEVICE IN A MOTOR VEHICLE

(75) Inventor: Martin Jeitner, Ostheim (DE)

(73) Assignee: PREH GmbH (DE)

( * ) Notice: Subject to any disclaimer, the term of this patent is extended or adjusted under 35 U.S.C. 154(b) by 1157 days.

(21) Appl. No.: 12/596,566

(22) PCT Filed: Apr. 18, 2008

(86) PCT No.: PCT/EP2008/003132
§ 371 (c)(1),
(2), (4) Date: Nov. 23, 2009

(87) PCT Pub. No.: WO2008/128718
PCT Pub. Date: Oct. 30, 2008

(65) Prior Publication Data
US 2010/0171632 A1    Jul. 8, 2010

(30) Foreign Application Priority Data

Apr. 20, 2007   (DE) .................. 10 2007 018 719

(51) Int. Cl.
*G08B 5/00*    (2006.01)
(52) U.S. Cl.
USPC .................. 340/815.4; 359/603; 359/265
(58) Field of Classification Search
USPC .................. 340/815.4; 359/603, 265
See application file for complete search history.

(56) References Cited

U.S. PATENT DOCUMENTS

| 2005/0195488 A1* | 9/2005 | McCabe et al. ........... 359/603 |
| 2008/0276857 A1* | 11/2008 | Fournier ............... 116/202 |

FOREIGN PATENT DOCUMENTS

| DE | 10342142 A2 | 4/2005 |
| DE | 102005043588 A1 | 2/2007 |
| EP | 0577331 A2 | 1/1994 |

OTHER PUBLICATIONS

International Search Report PCT/EP2008/003132 Dated Sep. 1, 2008.

* cited by examiner

*Primary Examiner* — Daryl Pope
(74) *Attorney, Agent, or Firm* — Cantor Colburn LLP

(57) ABSTRACT

The invention relates to a display device (1, 20) in a motor vehicle, consisting of a display (3, 25), a transilluminatable screen (4, 21) disposed behind the display (3, 25), a lighting means (6, 23) and a reflector (7, 24), wherein the lighting means (6, 23) is attached in the display device (1, 20) between the screen (4, 21) and the reflector (7, 24) and the light (L) of the lighting means (6, 23) can be parallelized and directed towards and through the screen (4, 21) onto the display (3, 25) by means of the reflector (7, 26), so that symbols that can be changed by means of the screen (4, 21) can be shown on the display (3, 24), and wherein the reflector (7, 24) is a facetted reflector.

10 Claims, 1 Drawing Sheet

INDICATOR DEVICE IN A MOTOR VEHICLE

CROSS REFERENCE TO RELATED APPLICATIONS

This patent application claims priority to co-pending German Patent Application DE 10 2007 018 719.1, filed Apr. 20, 2007 which is hereby expressly incorporated by reference in its entirety as part of the present disclosure.

BACKGROUND OF THE INVENTION

The invention relates to a display device in a motor vehicle, consisting of a display, a transilluminatable screen disposed behind the display, a lighting means and a reflector, wherein the lighting means is attached in the display device between the screen and the reflector and the light of the lighting means can be parallelized and directed towards and through the screen onto the display by means of the reflector, so that symbols that can be changed by means of the screen can be shown on the display.

BRIEF DESCRIPTION OF RELATED ART

In modern motor vehicles, it is possible for the operator to choose from a multitude of functions provided by the motor vehicle. In order to facilitate operation, for ergonomic reasons and in order to provide the operator with a menu-based function selection, it is known to display various symbols, texts and icons in displays, screens and control elements. In this case it is possible, for example, to electronically assign various functions to a control key and to display them on the surface of the key, which herein is referred to as a display. If, for example, the function of switching on the ventilator fan is assigned to the key in the ventilator system menu, then the display showing a ventilator fan appears on the surface of the key. If the volume function is assigned to the key in another menu item, then the display in the form of a loudspeaker, for example, appears on the surface. The operator is thus provided with a manageable number of control keys, which makes the operation of the motor vehicle considerably simpler. It should be mentioned already at this point that the display device according to the invention is not limited to keys, control elements or displays such as display screens, but that it relates to all control elements in which changeable symbols can be displayed.

A control element with freely programmable symbols known from the prior art is known from the published patent application DE 103 42 142 A1. What is described here is the generation of freely programmable symbols on a keycap of a control button of a motor vehicle. The displaying of symbols in the keycap independent from the movement of the key is in this case achieved by the light emitted by a lighting means being parallelized by means of a lens and falling through a programmable screen onto the inside of the keycap. By parallelizing the light, the divergence of the lighting means is canceled, and a symbol which is independent from the position of the keycap above the screen is shown on the keycap.

Another control element with freely programmable symbols for a motor vehicle is disclosed in DE 10 2005 043 588 A1. This generic prior art describes a control element in which the parallelized light required for the positionally independent display of symbols is generated by means of a concave mirror. In order to reduce the structural height, the lighting means is in this case attached between the screen and the concave mirror in the control element. Coming from a lighting means, the light is emitted onto a concave mirror and directed from there in a parallelized form through a screen, whereby freely programmable symbols can be displayed on the keycap.

BRIEF SUMMARY OF THE INVENTION

It is the object of the invention to provide a backlight for generating almost parallel light for illuminating displays which have a particularly high efficiency. Moreover, the parallelization of the light is to be realizable in an inexpensive and constructionally simple way.

The above object is achieved according to the invention by the reflector for obtaining the parallel light being a facetted reflector. By orienting the facets of the facetted reflector towards the position of the lighting means in the control element, it is possible according to the invention to provide an illumination of displays with particularly high efficiency.

Advantageous embodiments of the invention are represented in the dependent claims. In particular, the arrangement of a lighting means, such as a light-emitting diode (LED) on a circuit board, makes it possible to achieve a large degree of parallelism of the light. It is particularly advantageous in this case if the light source is attached approximately centrally in the control element relative to the facetted reflector. In this case, the circuit board has openings, which can also be referred to as recesses or apertures, and through which the light emitted by the lighting means and reflected by the facetted reflector can be directed onto the screen. Moreover, this offers the advantage that the recess in the circuit board can be formed in such a way that light diverging in the marginal areas can be eliminated, so that appropriate parallel light is provided to the display area for generating symbols, text or icons.

Coming from the lighting means, light arrives on the facetted reflector. The reflector, as it is also shown by way of example in the figures, is also referred to as a facetted reflector because it consists of a plurality of reflector members. The reflector members are oriented in such a way so as to generate substantially almost parallel light. Moreover, light is being reflected such that no shadows are generated and the LCD is illuminated in a homogeneous manner. In order to obtain a higher luminance, the area of the reflector used for illumination can be larger than the existing LCD surface. In contrast to a plane mirror, light is not directly reflected back into the light source, but laterally past it. The facetted reflector is in this case defined by a plurality of reflector members which, depending on the distance to the lighting means, the position of the lighting means relative to the facetted reflector, and the position of the facetted reflector relative to the screen, have a different orientation. The orientation, that is, the angle of the reflector members, is oriented such in this case that light coming from the lighting means is reflected in such a way on each reflector member or facet element that almost parallel light is directed onto the screen. Parallel means that the light beams coming from the facetted reflector are being directed in the direction of the screen so as to be parallel; in this case, they are almost or exactly rectangularly incident on the screen. Due to the very homogeneous parallelization of the light, an image of the symbol generated on the screen can very clearly be depicted as a display on the control element.

BRIEF DESCRIPTION OF THE SEVERAL VIEWS OF THE DRAWING

The invention is explained in more detail below with reference to two exemplary embodiments.

DETAILED DESCRIPTION OF THE INVENTION

Figure 1:
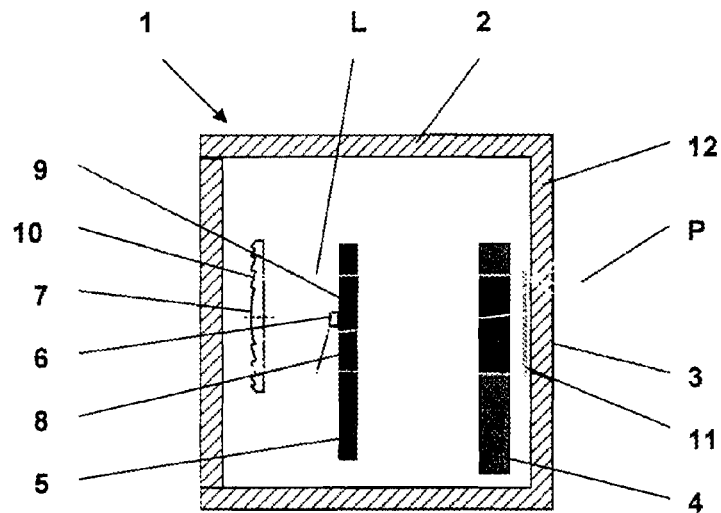
FIG. 1 shows a cross-section through a display device in a motor vehicle.

FIG. 1 shows a display device 1 shown in principle and in section. A transilluminatable screen 4, behind which a circuit board 5 is attached in the housing 2, is disposed in a housing 2 directly behind a display 3. A lighting means 6 is attached and electrically connected on the circuit board 5. A facetted reflector 7 is attached behind the circuit board in the housing 2, as seen once again from the display 3. The circuit board 5 includes openings 8, 9, so that the light beams L, coming from the lighting means 6, reflected on the facet members 10, can fall through the opening 9 onto the screen 4, and through the screen onto the display 3.

The facetted reflector 7 comprises reflector members 10, which, as can be clearly seen in FIG. 1, have different angles of inclination, so that the light is reflected differently depending on the position of the lighting means 6 relative to the facetted reflector 7 or each individual area or facet member or reflector member 10, respectively. On the one hand, this different angle of reflection makes it possible to generate homogeneous, parallelized light L, and on the other hand, it is possible, by means of the orientation of the reflector elements 10, to illuminate homogeneously and without the formation of shadows also those areas of the circuit board 5 behind the lighting means 6 by means of merely almost parallelized light.

In the exemplary embodiment of a display device 1 shown in FIG. 1, the lighting means 6 is located approximately centrally above the facetted reflector 7. It is thus possible to configure the facetted reflector so as to be symmetrical, so that the display device can be manufactured inexpensively. It is another advantage of the display device according to the invention that a very compact constructional design of the display device 1 is made possible because the circuit board can be disposed between the reflector and the screen. An exceptionally compact display device 1 can thus be realized, because other electronic components required for the display or function of the symbols on the screen, or for controlling, can be mounted on the circuit board 5.

The light L is directed almost parallel onto the transilluminatable screen by the facetted reflector 7. In this exemplary embodiment, the screen is designed as a liquid crystal display (LCD). LCD's are inexpensive standard components which ensure good imaging quality at low costs. The LCD 4 is controlled by a control device not shown herein, so that desired symbols, text or an icon can be generated. The LCD 4 thus is a freely programmable screen, so that animated symbols can also be shown in the display 3.

In the embodiment shown in FIG. 1, the display device 1 comprises a diffusion sheet 11 applied onto the rear of the display 3. The diffusion sheet 11 has a diverging effect as is indicated by the arrows P. It is thus possible to achieve, by means of the light L and the screen 4, a display 3 that is very sharp with regard to contours, wherein a diverging light P can be generated in the display 3 by means of the diffusion sheet 11, which can also be configured as a diffusion layer 11 such as, for example, a roughened surface, so that the display 3 is clearly visible from all sides. Alternatively, the diffusion sheet 11 can also be attached on the screen 4 in the direction of the display 3.

The display device substantially consists of a lighting means 6, a facetted reflector 7 and a transilluminatable screen 4. Exceptionally precise symbols can be depicted in the display 3 by means of these elements 4, 6, 7. In this exemplary embodiment, the display 3 consists of a translucent plastic such as, for example, polycarbonate (PC) or polymethylmethacrylate (PMMA), and preferably has a thickness of about 6 mm. The housing 2, which in this case is shown merely by way of example, can be a key, a rotary button, a rotary/push button or a direct display as a screen or display screen in a motor vehicle.

The substantial issue of the invention in this case is achieving a parallel light for transilluminating a screen 4, so that very exact symbols can be depicted on a surface 12.

Figure 2:
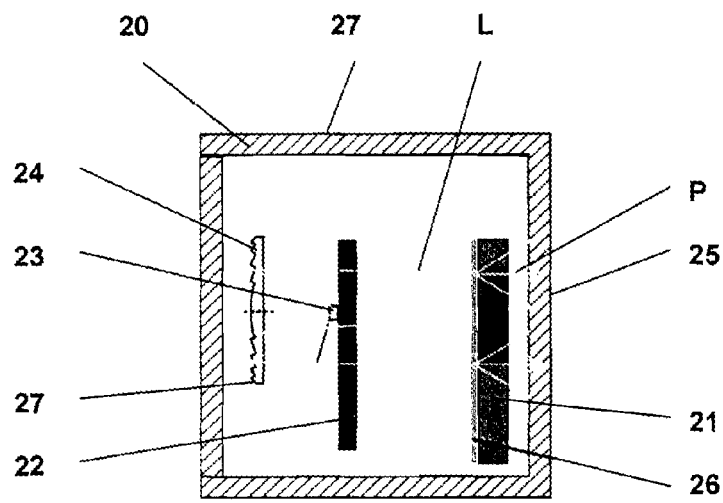
FIG. 2 shows another embodiment of a display device in a motor vehicle, which is also represented in principle and in section with its most essential elements.

FIG. 2 shows an alternative structure of a display device 20, which substantially corresponds to the structure of the exemplary embodiment according to FIG. 1. Once again, included are a screen 21, a light source 23 attached to a circuit board 22, and a facetted reflector 24. The light emitted by means of the light source 23 is cast onto a display 25. The function and structure correspond to the exemplary embodiment according to FIG. 1.

A substantial difference lies in the fact that a diffusion sheet 26 is disposed on the rear side of the screen 21, as seen from the display 25. It is thereby accomplished that the light diverges already directly in front of the screen. Thus, the diffusion sheet 26 acts like a plurality of lighting means disposed directly behind the screen 21.

It should be noted that such a structure of a display device 1, 20 is particularly suited to be used where the display 3, 25 is movably accommodated in a housing 2, 27, as is the case in push keys, for example. The parallel light L is independent from the position of the display 3, 25 relative to the light source 6, 23, because parallel light L is incident upon the screen 4, 21. It is advantageous in this case if the screen 4, 21 is also movably accommodated in the housing 2, 27, together with the display 3, 25.

The facetted reflector 7, 24 is configured such that the emitted light L is directed so as to be parallel onto the display 3, 25, depending on the position relative to the lighting means 6, 23. The individual facet members 10 of the facetted reflector 7, 24 are in this case oriented in different ways with respect to the lighting means 6, 24. As can be seen by way of example from the FIGS. 1 and 2, the individual facet members 10 have different angles relative to a central line through the facetted reflector 7, 24, in which the center line is drawn in as a dashed line, and the lighting means 6, 23. There is, in the center of the facetted reflector 7, 24, an almost even surface, because, for parallel reflection, the light beams L almost only have to be reflected and deflected only minimally in order to be incident on the display in a parallel manner. The reflector member 10 has a small angle relative to the center line, because here, the light beams L must be deflected by small angles. In contrast, large angles relative to the center line are required at the outer edge 27 in order to direct the light beams L onto the screen 4, 21 and subsequently onto the display 3, 25 in a parallel manner. Consequently, the facetted reflector 7, 24 comprises different angle areas in which the facet members 10 are disposed in different angles, the areas are in this case subdivided into parallel or almost parallel, small angles to large angles. The exemplary embodiments show a continuous progression from parallel to small to large angles.

The formation of the angles and/or angle areas and/or parallel surfaces of the facet members 10 depends on the position of the lighting means 6, 23 relative to the facetted reflector 7, 24 and varies according to the application and arrangement of the lighting means 6, 23 relative to the facetted reflector 7, 24, to the opening 8, 9, to the screen 4, 21 and to the display 3, 25. Angles of between 0° to 30° are herein referred to as small angles, and angles exceeding 30° are herein referred to as large angles.

What is claimed is:

1. Display device in a motor vehicle, comprising:
a display;
a transilluminatable screen disposed behind the display;
a lighting means; and
a reflector;
wherein the lighting means is attached in the display device between the screen and the reflector;
wherein a light of the lighting means can be parallelized and directed towards and through the screen onto the display by means of the reflector, so that symbols that can be changed by means of the screen can be shown on the display;
wherein the reflector is a facetted reflector;
wherein facet members are oriented depending on a position of the screen, so that light can be directed onto the screen in a substantially parallel manner; and
wherein the facet members, depending on the lighting means, are oriented such that the screen can be illuminated over its entire surface, wherein the light can be directed behind the area of a circuit board accommodating the lighting means.

2. Display device according to claim 1, wherein the circuit board is attached in the display device between the screen and the reflector, wherein the lighting means is attached on a side of the circuit board disposed facing away from the screen and wherein the circuit board comprises openings, so that the light of the lighting means can be directed by the reflector through the openings towards the screen.

3. Display device according to claim 1, wherein the circuit board, the reflector, and the screen are attached parallel to the display in the display device.

4. Display device according to claim 1, wherein the lighting means is attached centrally relative to the reflector in the display device.

5. Display device according to claim 1, wherein at least one further lighting means is disposed on sides of the circuit board facing away from the screen.

6. Display device according to claim 5, wherein the further lighting means has the same or a different emission spectrum.

7. Display device according to claim 1, wherein at least one diffusion sheet is applied on the display and/or the screen between the display and the screen.

8. Display device according to claim 1, wherein at least one diffusion sheet is applied on the screen and on a side facing away from the display.

9. Display device according to claim 1, wherein the display device is a part of a control element comprising a push button.

10. Display device according to claim 1, wherein the display device is a part of a control element, or wherein the display is associated with a control element, so that the display can be controlled by means of the control element.

* * * * *